(12) United States Patent
Penninger et al.

(10) Patent No.: US 6,561,596 B2
(45) Date of Patent: May 13, 2003

(54) BRAKE BOOSTER

(75) Inventors: William John Penninger, Niles, MI (US); Robert Keller Wilson, Granger, IN (US); Richard Becker McClain, South Bend, IN (US); Kenneth Scott Towers, Granger, IN (US)

(73) Assignee: Robert Bosch Corporation, Broadview, IL (US)

( * ) Notice: Subject to any disclaimer, the term of this patent is extended or adjusted under 35 U.S.C. 154(b) by 41 days.

(21) Appl. No.: 09/894,106

(22) Filed: Jun. 28, 2001

(65) Prior Publication Data

US 2003/0067218 A1 Apr. 10, 2003

(51) Int. Cl.$^7$ .................................................. B60T 8/44
(52) U.S. Cl. ...................... 303/114.1; 188/359; 60/560; 60/547.1
(58) Field of Search .................. 60/560, 547.1, 60/547.2, 547.3, 555–559; 188/358, 359; 303/114.1

(56) References Cited

U.S. PATENT DOCUMENTS

| | | | | |
|---|---|---|---|---|
| 3,978,667 A | * | 9/1976 | Ohara | 60/403 |
| 4,539,892 A | * | 9/1985 | Mackiewicz et al. | 60/547.3 |
| 4,592,599 A | * | 6/1986 | Belart | 303/114.1 |
| 4,736,993 A | * | 4/1988 | Reinartz et al. | 303/114.1 |
| 4,736,995 A | * | 4/1988 | Reinartz et al. | 188/358 |
| 4,743,073 A | * | 5/1988 | Gruenberg | 303/114.1 |
| 4,761,042 A | * | 8/1988 | Seibert et al. | 303/114.1 |
| 4,986,613 A | * | 1/1991 | Nishii et al. | 303/114.1 |
| 5,054,860 A | * | 10/1991 | Nomura et al. | 303/114.1 |
| 5,065,573 A | * | 11/1991 | Nomura et al. | 303/114.1 |
| 5,081,841 A | * | 1/1992 | Nishii | 60/560 |
| 5,393,131 A | * | 2/1995 | Nomura et al. | 303/114.1 |

FOREIGN PATENT DOCUMENTS

| | | | | |
|---|---|---|---|---|
| JP | 03057760 A | * | 3/1991 | B60T/13/12 |

* cited by examiner

Primary Examiner—Jack Lavinder
Assistant Examiner—Robert A. Siconolfi
(74) Attorney, Agent, or Firm—Leo H McCormick, Jr.; Warren Comstock (57) ABSTRACT

A hydraulic brake booster (12) for use in a brake system (10) having a first housing (100) with a first bore (102) separated from a second bore (104). The first bore (102) retains a power piston (118) and the second bore (104) retains a control valve arrangement (170). A push rod (30) of an input arrangement (49) is connected to the power piston (118) and linked to the control valve arrangement (170) by a lever arrangement (50). A second housing (200) encloses the control valve arrangement (170), lever arrangement (50) and a projection (117) that extends from the power piston (118) to define a cavity or relief chamber (202) having a permanent low pressure. The input arrangement (49) supplies the control valve arrangement (170) with an input force in response to a braking force applied to the push rod (30) to regulate the communication of pressurized supply fluid from the second bore (104). The hydraulic brake booster is characterized in that the regulated supply fluid acts on the first piston (118) to develop a corresponding operational fluid pressure which is communicated to a first set of wheel brakes (14,14') while the regulated supply fluid is directly communicated to a second set of wheel brakes (18,18') to effect a brake application.

16 Claims, 4 Drawing Sheets

BRAKE BOOSTER

This invention relates to a hydraulic brake booster for use in a brake system having manual actuation to effect a primary brake application and hydraulic actuation to effect a secondary brake application to alleviate or at least attenuate a resultant of situations which may contribute to wheel skid, wheel spin or dynamic control of a vehicle.

BACKGROUND OF THE INVENTION

In hydraulic brake boosters of the type disclosed in U.S. Pat. No. 4,441,319, a valve member is moved by an input force applied by an operator to a brake pedal to regulate the flow of pressurize fluid from a source to an operational chamber. The regulated pressurized fluid acts on and provides a force to move pistons in a master cylinder and effect a brake application. In order to move the valve member, the input force must first overcome the resistance of a spring that urges the valve member into engagement with a seat to seal a source of pressurized fluid. Subsequently, fluid pressure acts on the seal and as a result, the frictional force acting on the seal also opposes the movement of the control valve which must be overcome to initiate the actuation of the control valve and the flow of regulated pressurized fluid to effect a brake application.

An effect of frictional resistance relating to seals is addressed and reduced by the structure for a brake booster as disclosed in U.S. Pat. Nos. 4,281,585; 4,539,892; and 4,625,515. This type brake booster includes a housing with a first and second bores connected to a pressure chamber with a power piston located in the first bore and a control valve located in the second bore. The control valve is connected to an input member by a lever arrangement. An input force applied to the input member through a brake pedal moves the power piston and control valve to allow pressurized fluid to flow into the pressurize chamber and act on the power piston to correspondingly move a master cylinder to develop an operational force and effect a brake application. While this brake booster functions in an adequate manner the control valve, lever arrangement, input member and powers piston are all exposed to the pressurized fluid during a brake application.

It has been suggested to incorporated structure in a hydraulic brake booster of a brake system to perform additional features such as traction control, dynamic operational control and anti-skid control. Unfortunately without structural adaptation, the brake pedal mirrors the movement of the power piston in the operation of the hydraulic brake booster in functional performance relating to such additional features. In order for the brake pedal to remain during such additional functions, structure is disclosed in U.S. Pat. No. 6,203,119 to move a control valve seat while holding the input member in a stationary position to meter secondary operational pressurized fluid to effect a secondary brake application.

SUMMARY OF THE INVENTION

A primary object of the present invention is to provide a brake booster having a balanced control valve arrangement for regulating pressurized supply fluid to power a first piston which in turn pressurizes operational fluid in a master cylinder to effect braking in a first set of wheel brakes and to directly supply the regulated pressurized supply fluid to effect braking in a second set of wheel brakes in response to either an operator input or a secondary input requesting a brake application.

The brake system of the present invention discloses a brake booster that includes structure to functionally effect traction control, dynamic control and anti-skid control features. In more particular detail, the brake booster includes a first housing with a first bore separated from a second bore. The first bore retains a first or power piston and is connected to a first set of wheel brakes while the second bore retains a control valve arrangement. The control valve arrangement is connected to an input member for the power piston by a lever arrangement and is positioned in the second bore by a second housing to define a supply chamber and an operational chamber. The supply chamber is connected to receive pressurized supply fluid while the operational chamber is connected by a first passage to a power chamber located in the first bore, by a second passage to a second set of wheel brakes and by a third passage to a relief chamber. With control valve arrangement in a rest position, the operational chamber is connected to the relief chamber while the supply chamber is sealed to retain the pressurized supply fluid. The second housing has a bore that retains a secondary actuation piston that is aligned with the control valve arrangement. The secondary actuation piston is maintained in a rest position by resilient members associated with the control valve arrangement. In response to an operator input force being applied to the input member, the power piston moves in the first bore to interrupt communications between the first bore and the relief chamber while at the same time, the lever arrangement moves the control valve arrangement to initially close the communication between the operational chamber and the relief chamber. Thereafter, the lever arrangement moves the control valve arrangement to allow metered flow of pressurized supply fluid into the operational chamber as regulated pressurized supply fluid. The regulated supply fluid is simultaneously communicated to the first bore and to directly effect a brake application of the second set of wheel brakes. The regulated supply fluid communicated to the first bore acts on the power piston, to pressurize fluid in the first bore and develop operational fluid that is communicated to effect a brake application in the first set of wheel brakes. On termination of the operator input, the power piston and control valve arrangement return to a rest position. The control valve arrangement is also responsive to communication of a second supply of pressurized fluid supplied to a secondary chamber under the control of an Electronic Control Unit (ECU). The second supply of pressurized fluid acts on the secondary actuation piston which initially moves the control valve arrangement to close the operational chamber from the relief chamber and thereafter moves the control valve arrangement to meter pressurized supply fluid into the operational chamber to created a regulated pressurized supply fluid that is selectively supplied to the first bore to develop the operational fluid for the first set of wheel brakes and directly to the second set of wheel brakes to effect a brake application as a function of a second brake request derived by inputs supplied to the ECU. The connection or linkage of the lever arrangement and the control valve arrangement includes a collar/sleeve member which allows for independent movement by the secondary actuation piston without a force component being transmitted into the input member such that a brake pedal through which an operator input is applied remains in a stationary position.

An advantage of the hydraulic brake booster of the present invention resides in a separate development of pressurized fluid for effecting a brake application in a first set of wheel brakes by regulated pressurized supply fluid which directly effects a brake application in a second set of wheel brakes.

A further advantage of the invention resides in a structural relationship of components for a hydraulic brake booster whereby a second housing engages a first housing to hold a control valve arrangement in the first housing such that a balanced pressure is maintained across the control valve arrangement and in that an input member, lever arrangement and a portion of the control valve arrangement is located in a low pressure relief chamber.

DETAILED DESCRIPTION

Figure 1:
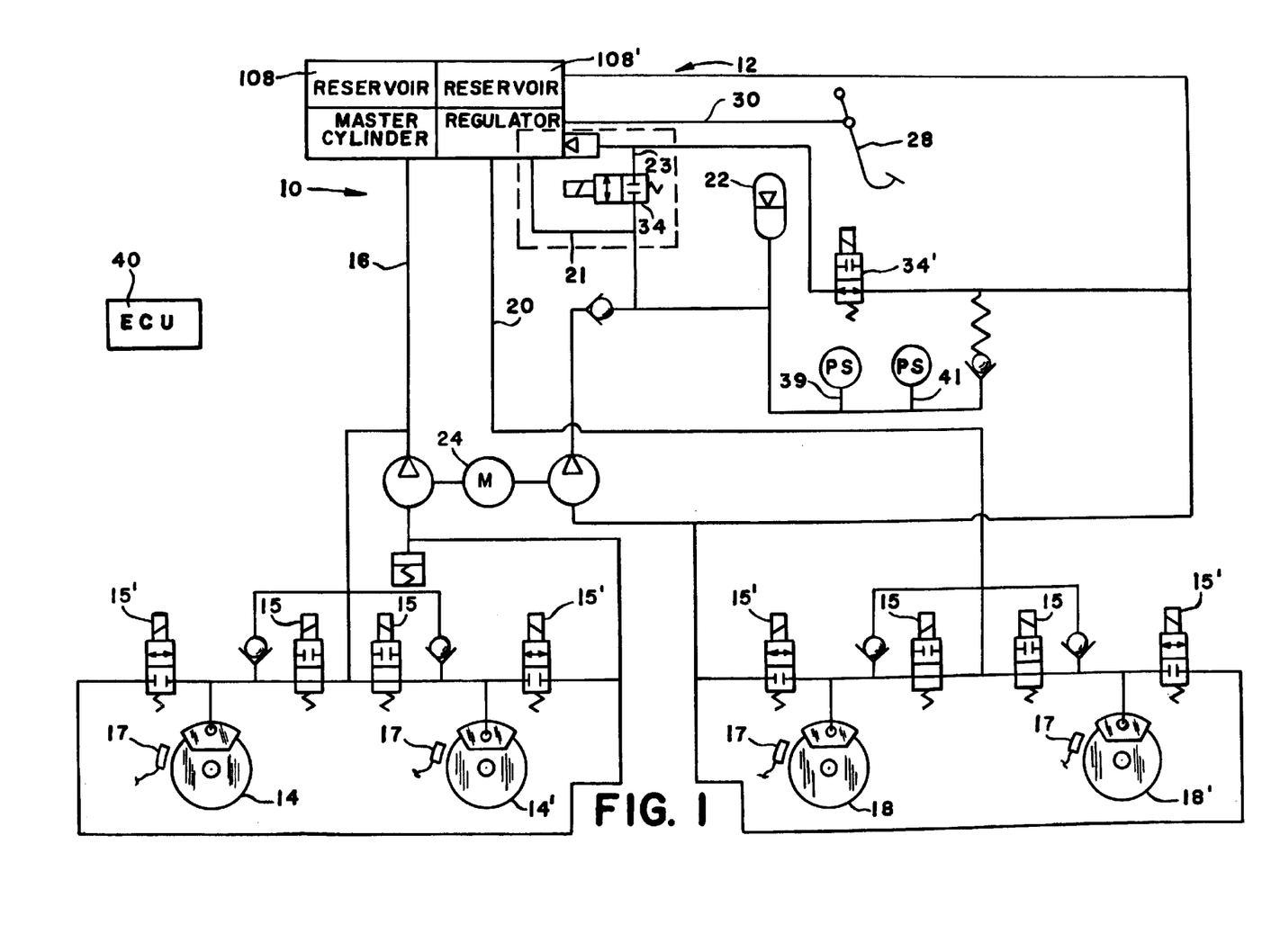
FIG. 1 is a schematic illustration of a brake system utilizing components made according to the present invention.

The brake system 10 as shown in FIG. 1 includes a hydraulic brake booster 12 connected to a first set of wheel brakes 14,14' by a first conduit 16 and to a second set of wheel brakes 18,18' by a second conduit 20. The hydraulic brake booster 12 receives pressurized supply fluid from a source that may include an accumulator 22 and a motor pump 24. The hydraulic brake booster 12 is selectively activated by either a manual force applied to an input arrangement 49 that includes brake pedal 28, input rod 30 and lever arrangement 50, to effect a first brake application or by a hydraulic force developed as a function of a signal received from an electronic control member (ECU) 40 to activate a solenoid valve 34 connected with the pressurized supply fluid to effect a second brake application.

The brake system 10 also includes a build solenoid valve 15, a decay solenoid valve 15' and a wheel speed sensor 17 for each wheel in the first set of wheel brakes 14,14' and in the second set of wheel brakes 18,18' to provide the electronic control unit (ECU) 40 with an input signals to provide information or data relating toga current functional operational of the vehicle. In addition to these input signals, the ECU 40 also receives and evaluates other inputs and data relating to the vehicle including but not limited to: the operation of the motor pump; the pressure of the pressurized supply fluid; dynamic forces experienced by the vehicle; accumulator fluid supply pressure, the level of fluid in a reservoir and etc., all inputs which relate to the operation of the vehicle and may effect a brake application.

Figure 2:
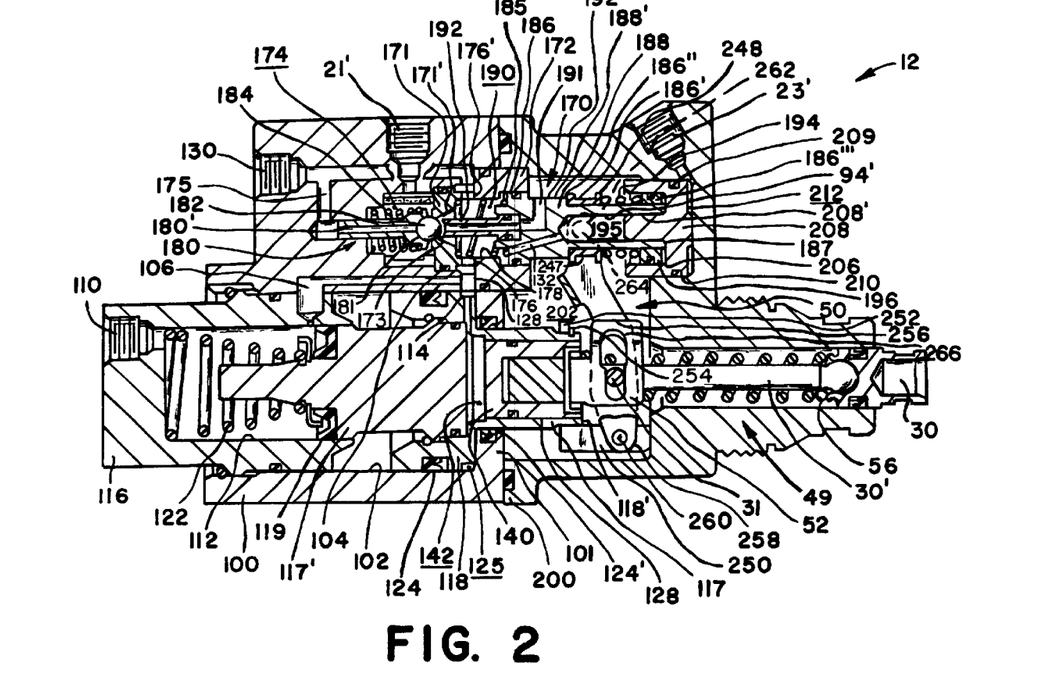
FIG. 2 is an sectional view of the hydraulic brake booster for the brake system of FIG. 1 illustrating a rest position for a power piston and a control valve arrangement prior to a brake application.

Functionally, the hydraulic brake booster 12 responds to an operator input force (manual input) applied to brake pedal 28 to directly communicate regulated pressurized supply fluid to wheel brakes 18,18' and indirectly by way of the development of operational pressurized fluid by a power piston 118 provided to wheel brakes 14,14' to effect a brake application. On termination of the operator input force to brake pedal 28, the operation of the brake booster is returned to a rest state as illustrated in FIG. 2. During the operating of the vehicle should inputs relating to the operational features or conditions currently experienced by the vehicle as evaluated by the ECU 40 indicate an undesirable situation is occurring or forthcoming, the ECU 40 is programmed to transmit an operating signal that activates a solenoid 34 to allow the flow of pressurized supply fluid from the accumulator 22 and hydraulically activate the hydraulic brake booster 12. When hydraulically activated, supply regulated pressurized fluid is directly communicated to wheel brakes 18,18' and depending on a current situation, the supply pressurized fluid may be selectively communicated to develop operational pressurized fluid by the power piston 118 which is supplied to wheel brakes 14,14' and effect a brake application that is designed to attenuate an undesirable operating condition which could effect the safe operation of the vehicle.

The hydraulic brake booster 12 is shown in more detail in FIG. 2 and includes a first housing 100 that is joined to a second housing 200. The first housing has a first bore 102 that is separated from a second bore 104. The second housing 200 engages the first housing 100 to define a cavity 202 which is located adjacent the first bore 102 and second bore 104. Cavity 202 is designed to be connected to reservoir 108 and as such is maintained at essentially a same low pressure as reservoir 108.

The first bore 102 of housing 100 is connected to the first set of wheel brakes 14,14' by way of conduit 16 which is connected through to an operational or output port 110 in end plug member 116, to cavity 202 in the second housing and to replenishing supply fluid available in fluid reservoir 108 by way of a flow path from compensation port 106 and to the to second bore 104 by a supply port 114 in passage 128 that receives metered pressurized fluid from an operational chamber 190. Power piston 118 is located in the first bore 102 and with an end wall 101 defines an actuation chamber 125 therein. A first annular projection 117 on power piston 118 extends through end wall 101 into the cavity 202 while a second annular projection 117' extends into a bore 112 formed in end plug member 116. The second annular projection 117' carries a seal 119 which in a rest position is located adjacent compensation port 106 to allow for free communication of fluid available in reservoir 108 to be communicated to conduit 16. A return spring 122, located between end plug member 116 and the second annular projection 117', urges the power piston 118 toward a rest position defined by end wall 101. A first seal 124 carried by power piston 118 engages bore 102 and a second seal 124' retained in end wall 101 is designed to seal actuation chamber 125 from cavity 202 which has a fluid pressure substantially equal to the fluid pressure in reservoir 108. The first annular projection 117 has a bore 128 that extends from end 118' to receives a piston 140 attached to the end extension 30' of push rod 30 of the input arrangement 49. Bore 128 is connected with actuation chamber 125 by a cross bore 114 and receives piston 140 to define a reaction chamber 142 within the power piston 118.

The second bore 104 is connected to receive pressurized supply fluid from the accumulator 22 by way of port 21' connected to supply conduit 21. The second bore 104 has several steps therein to receive and retains a control valve arrangement 170. Regulated pressurized supply fluid from the second bore is simultaneously communicated to the first bore 102 for developing an operational fluid pressure by the power piston 118 which is communicated to the first set of wheel brakes 14,14' and directly to a second passage 130 in housing 100 for supplying the second set of wheel brakes 18,18' to effect a brake application.

The control valve arrangement 170 is located in the second bore 104 and is defined by a cylindrical member 172 which is fixed in the second bore 104; a movable closure arrangement 180; a movable plunger 188; a return or closure spring 185; a sleeve or collar 248; a return spring 194; and a bearing 196. The cylindrical member 172 is held in the second bore 104 by the second housing 200 to define a supply chamber 174 within the second bore 104. The supply chamber 174 is connected to accumulator 22 by way of port 21' and may freely receive pressurized supply fluid available from either accumulator 22 or motor pump 24.

The cylindrical member 172 has a wall 171 with a tapered opening 171' which is surrounded by a seat 173, an axial bore 178 and a cross bore 176,176' which connects axial bore 178 to the actuation chamber 125 by way of the first passage 128 and to the second set of wheel brakes 18,18' by way of the second passage 130.

The closure arrangement 180 includes a stem 180' designed to axially slide in bore 104, a head 181 formed on the end of stem 180' that retains a ball 182 and a return spring 184. The return or closure spring 184 acts on head 181 to urge ball 182 toward wall 171 of cylindrical member 172 and into engagement with seat 173 to seal the supply chamber 174 and retain the pressurized supply fluid therein. Bore 104 is also connected to the second passage 130 by a passage 175 to provide a flow path through which fluid available in the second passage 130 is communicated to act on stem 180' and assist in balancing the fluid pressure across the ball 182.

The plunger 188 is defined by a cylindrical body 188' that has a peripheral surface 186 that engages bore 178 in the cylindrical member 172 to define an operational chamber 190 within the second bore 104. A hollow stem 192 connected to the cylindrical body 188' extends into the operational chamber 190 and connects the operational chamber 190 with a relief chamber formed by cavity 202 between the first 100 and second 200 housings. Cylindrical body 188' also has a bore 94 formed therein which is connected to the operational chamber 190 by a third passage 132 and a peripheral surface 186 thereon has a shoulder 186' that separates a diameter 186" from a diameter 186"'. A port 192' in diameter 186" forms an exit for a passage 191 for the hollow stem 192 through which the operational chamber 190 is connected to the cavity or relief chamber 202 while diameter 186"' provides a surface for receiving sleeve or collar 248 through which input forces are received from the lever arrangement 50. A bearing 196 which surrounds diameter 186"' of cylindrical body 188 is sealingly located in an indentation 206 formed in a second piston 208. The second piston 208 being located in a bore 210 of the second housing 200. The sealing engagement of bearing 196 with indentation 206 in the second piston 208 defines a reaction chamber 195 within the bore 94 of plunger 186. The second piston 208 also carries a seal 209 that engages bore 210 to define a secondary actuation chamber 212 in the second housing 200. The secondary actuation chamber 212 is connected to conduit 23 and selectively receives pressurized supply fluid from a source (either accumulator 22 or motor pump 24) on activation of solenoid 34 by an input signal from the ECU 40. The second piston 208 has a projection 208' that extends therefrom and engages bore 94 of plunger 188 to assist in aligning the control valve arrangement 170 in the second bore 104.

Figure 7:
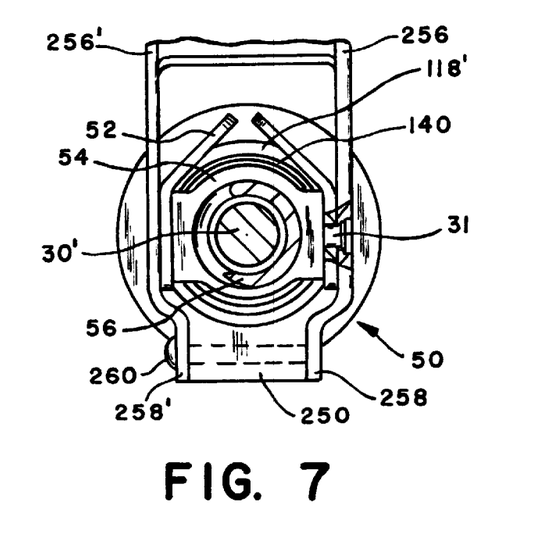
FIG. 7 is a sectional view illustrating the lever arrangement that connects the input member with the control valve arrangement of FIG. 1.

The lever arrangement 50 while functionally similar to levers disclosed in the prior art is distinguished therefrom by a base 250 having an annular collar 252 that is located on the peripheral surface of the first annular projection 117 by a snap ring 254 to define an extension of the power piston 118. The lever arrangement 50, as additionally illustrated in FIG. 7,includes first and second arms 256, 256' and is of a type more fully disclosed in the prior art including U. S. Pat. No. 4,625,515 wherein arm 256 has a first end 258 and arm 256' has a first end 258 fixed to the base 250 by a pivot pin 260 and a second end 262 with a nib or button 264 that is located in groove 247 of sleeve or collar 248 carried on,peripheral surface 186"' of plunger 188. A bracket 52 carried by push rod extension 30' has a base 54 which is urged into engagement with piston 140 by a spring 56. Parallel side walls 58,58' that extend away from base 54 each have a vertical slot 266 (only one of which is shown) for receiving a corresponding nib 31 located on arm 256,256' to form a connection with input push rod extension 30'. The functional operation of the sleeve or collar 248 with the lever arrangement 50 defines over the prior lever arrangements and permits independent movement of the power piston 118 and control valve arrangement 170 such that movement of the input push rod 30 is coordinated with the movement of plunger 188 and balancing of the position of the plunger 188 with respect to seat 173 on wall 171 to meter flow into the operational chamber 190 is not adversely effect the development of the operational fluid pressure by the power piston 118.

Mode of Operation

When an operator turns on an ignition switch of a vehicle many sensors are activated to supply an ECU 40 with data and information relating to the operational condition of the vehicle and surrounding environment, such data includes inputs from a low pressure sensor 39 and high pressure sensor 41 in brake system 10 which provide the ECU 40 with a signal indicative of the current fluid pressure of the supply fluid stored in accumulator 22 for powering a brake application. If the fluid pressure in the accumulator 22 is below a predetermined value where several brake applications could not be effected, the ECU 40 activates motor pump 24 to build up fluid pressure of the supply fluid stored in the accumulator 22 before allowing a parking brake to be released. When motor pump 24 builds up the fluid pressure in the supply fluid as received in accumulator 22 to a desired fluid pressure, the parking brake is released and the transmission of the vehicle can now be engaged to move the vehicle.

The hydraulic booster 12 for the brake system 10 of FIG. 1 is to shown in a rest position in FIG. 2 with the power piston 118 and control valve arrangement 170 respectively urged toward stops by return springs 122, 184. In a rest position, pressurized supply fluid available in accumulator 22 is communicated to supply chamber 174 by way of inlet port 21' and conduit 21. With power piston 118 at rest, base. 250 of the lever arrangement 50 that is attached to annular projection 117 engages housing 200 such that bore 112 therein is connected to cavity 202 and reservoir 108 by compensation port 106. In the rest position, actuation chamber 125 is also connected to cavity or relief chamber 202 by way of passage 128, cross bore 176,176', operational chamber 190, stem 192, passage 191 and port 192'. The fluid pressure of the fluid in reservoir 108 and relief chamber 202 is the same and as illustrated connected to each other for replenishing purposes, however, structure is envisioned to provided independence and separate operation of each system when the fluid level in the reservoir 108 drops to a predetermined level. With the fluid pressure in bore 112, operational chamber 125 and relief chamber or cavity 202 the same, the fluid pressure across the power piston 118 is also the same and as a result return spring 122 maintains the input arrangement 49 in a rest position, as illustrated in FIG. 2. Similarly, the fluid pressure across the control valve arrangement 170 is also balanced as passages 175 and 130 are connected to operational chamber 190 and communicate equal fluid pressure across the closure arrangement 180 such that spring 184 urges ball 182 into engagement with seat 173 to seal chamber 174. In addition, return spring 185 acts on cylindrical body 188' of plunger 188 to urge the plunger 188 toward the second piston 208 and maintain the lever arrangement 50 in a substantially vertical position.

Figure 3:
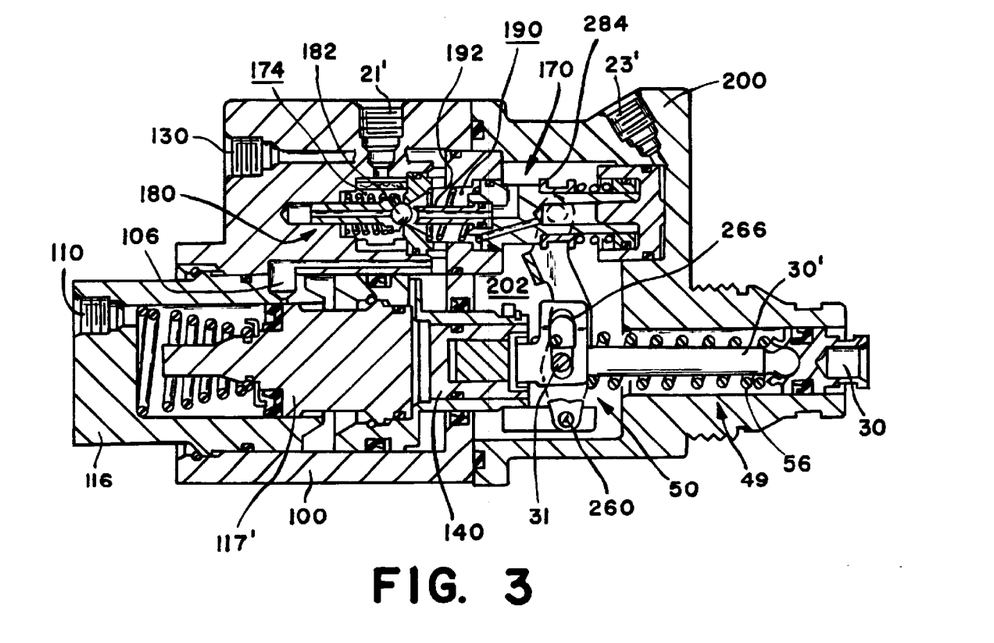
FIG. 3 is a sectional view of the hydraulic brake booster of FIG. 2 illustrating an intermediate position of the control valve arrangement during a manual brake application.
Figure 4:
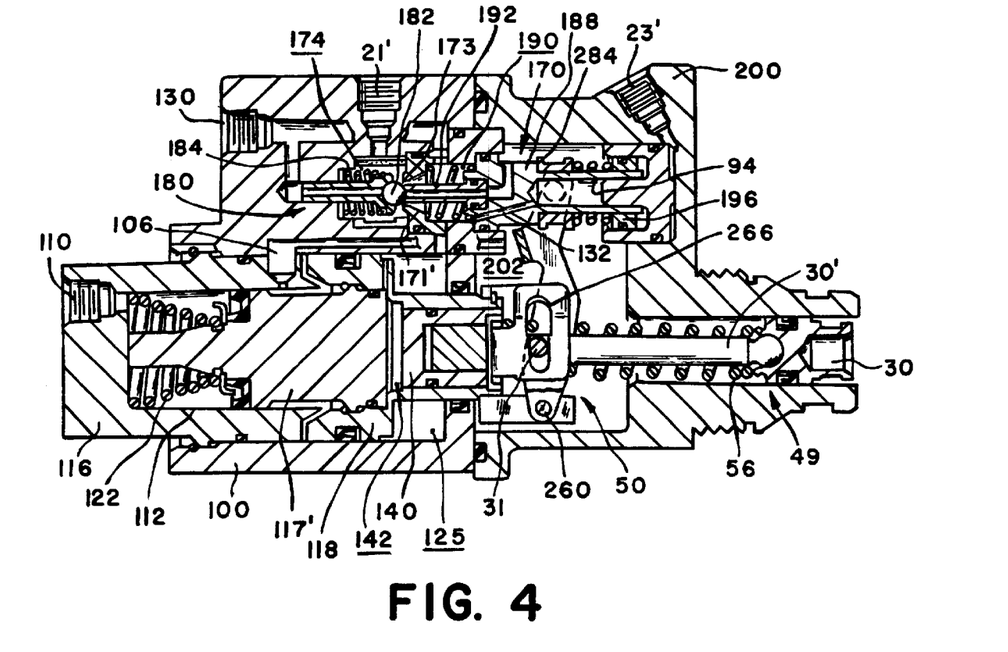
FIG. 4 is a sectional view of the hydraulic brake boost of FIG. 2 illustrating a final position of the control valve arrangement during a manual brake application.

When it is desired to effect a brake application, an input force is applied to brake pedal 28. The input force is transmitted by input push rod 30 and extension 30' to move piston 140 within bore 141 and the power piston 118 in bore 102. Movement of power piston 118 within bore 102 closes bore 112 as seal 119 on annular projection 117' moves past compensation port 106. The input force as applied to push rod 30 is transmitted into lever arms 256 from bracket 52 by way of pins 31 and since end 258 is fixed on 260, end 262 pivots to exert a corresponding force on plunger 188 by way of pins 264 acting through collar 248. The force transmitted through sleeve 248 urges plunger 188 toward ball 182 and after overcoming spring 185, stem 192 engages ball 182 in a manner as shown in FIG. 3. When stem 192 engages ball 182 communication is terminated between the operational chamber 190 and cavity or relief chamber 202. Thereafter, the input force applied to the plunger 188 now ball 182 moves off of seat 173 to allow pressurized supply fluid to flow through opening 171' into the operational chamber as regulated pressurized supply fluid in a manner as illustrated in FIG. 4. The regulated pressurized supply fluid is simultaneously communicated to the operational chamber 125 to initiate braking of the first set of wheel brakes 14,14' by way of operational fluid pressurized developed by movement of the power piston 118 and to passage 130 to directly initiate braking of the second set of wheel brakes 18,18'. In more detail, the regulated pressurized supply fluid presented to chamber 125 acts on power piston 118 and after overcoming return spring 122 moves the power piston 118 and annular projection 117' toward the end cap 116 to pressurize operational fluid in bore 112. This pressurized operational fluid is communicated to the first set of wheel brakes 14,14' to effect a brake application therein and is coordinated with the regulated pressurized supply fluid which is directly communicated to the second set of wheel brakes 18,18' to effect a brake application therein.

Figure 5:
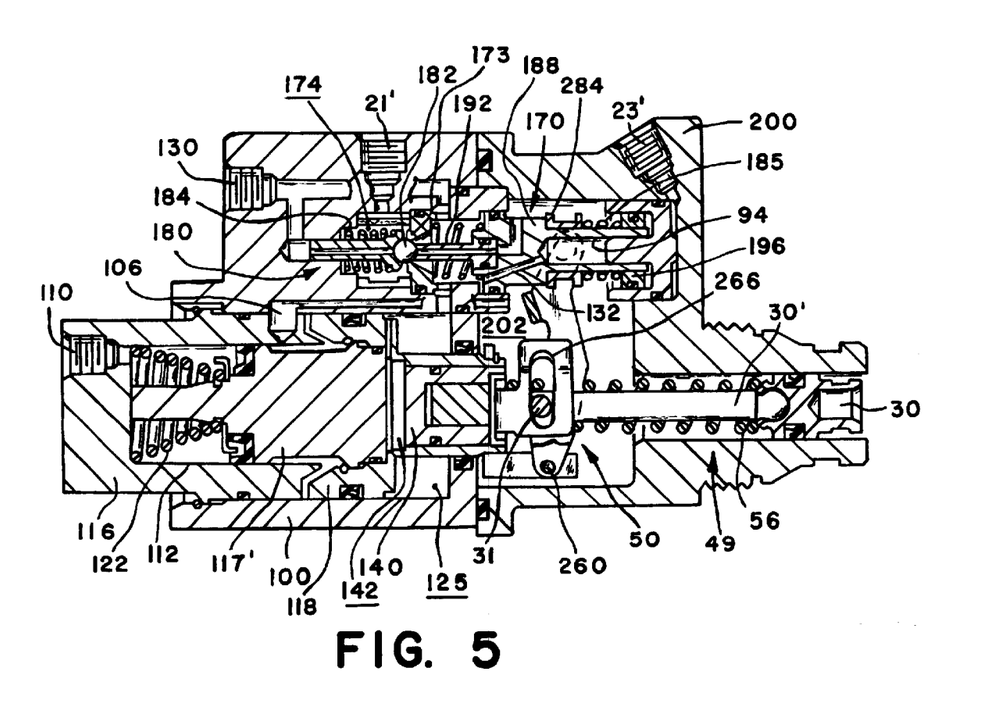
FIG. 5 is a sectional view of the hydraulic brake booster of FIG. 2 illustrating a balanced position of a control valve arrangement during a brake application.

In the fully activated position, as shown in FIG. 4, the regulated pressurized supply fluid is communicated to reaction chamber 142 and acts on piston 140 to provide push rod 30 of the input arrangement 49 with a feed back indicative of the regulated pressurized supply fluid being supplied to the wheel brakes to effect a brake application. At the same time, a balance effect is achieved in the control valve arrangement 170, as regulated pressurized supply fluid from operational chamber 190 is communicated through passage 132 into bore 94 and equally acts across plunger 188 and bearing 196 to mitigate any effect the pressurized supply fluid may have on the input force acting on plunger 188 through sleeve 248. When the reaction force as developed by pressurized supply fluid and acting on piston 140 balances the input force as communicated through input push rod 30 balance, the arms 256 of the lever arrangement 50 again pivots on pin 260 to allow return spring 184 to move ball 182 into engagement with seat 173 and terminate the flow of pressurized supply fluid into operational chamber 190 in a manner as illustrated in FIG. 5. As long as the input force remains constant, the power piston 118 and control valve arrangements 170 remain the respective positions, illustrated in FIG. 5, to effect a brake application wherein regulated pressurized supply fluid is directly communicated to the second set of wheel brakes 18,18' and operational pressurized fluid developed by movement of the power piston 118 is communicated to the first set of wheel brakes 14,14'. On termination, of the input force by an operator on brake pedal 28, return spring 122 moves the power piston 118 to a rest position and return spring 184 moves closure member 180 and return spring 185 moves plunger 188 to a rest position as shown in FIG. 2.

In the hydraulic booster 12 shown in FIG. 2, the control valve arrangement 170 functions in a smooth and substantially frictionless manner as the closure arrangement 180 and plunger 188 are arranged such the pressurized supply fluid and regulated pressurized supply fluid do not directly act on seals associated with the control valve arrangement 170.

Figure 6:
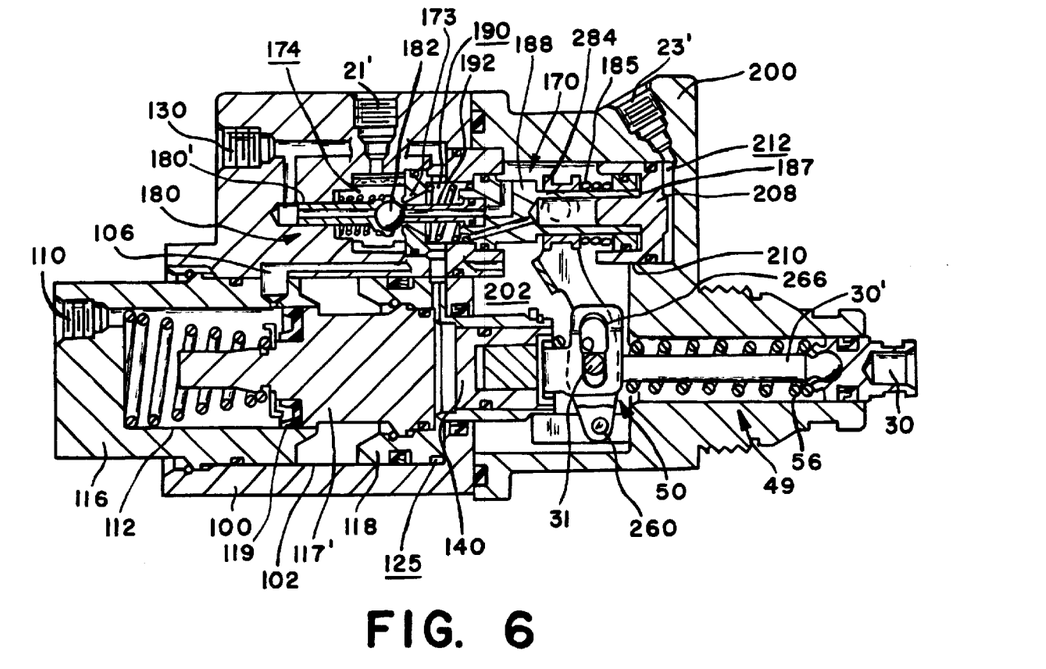
FIG. 6 is a sectional view of the hydraulic brake booster of FIG. 2 illustrating an actuation position of the control valve arrangement during a hydraulic brake application.

The secondary actuation feature of the hydraulic booster 12 for the brake system 10 is under the control of the ECU 40. The ECU 40 is to responsive to situations that may adversely effect a desired operation of the vehicle, and in particular wheel skid, wheel spin or sway of the vehicle. In such situations, sensors such the wheel speed sensors 17 provide the ECU 40 with input signals which are evaluated to determine if a brake application would be justified to achieve a safer or more effective operation of the vehicle. When the ECU 40 determines a secondary brake actuation is warranted, an operational signal is sent to activate solenoid 34 which allows pressurized supply fluid to flow from accumulator 22 (a second and independent accumulator may be utilized for some applications) into secondary actuation chamber 212 by way of conduit 23 and inlet port 23' in the second housing 200. The pressurized supply fluid in secondary actuation chamber 212 acts on and moves the second piston 208 in bore 210 to provide a secondary actuation force that acts on end 187 of plunger 188 and after overcoming spring 185 moves stem 192 into engagement with ball 182. The lever arrangement 50 remains stationary as surface 186''' on plunger 188 slides in sleeve 248 and as a result brake pedal 28 remains stationary after an initial drop corresponding to movement of power piston 118 sufficiently past compensatory port 106 to close bore 102. Once stem 192 engages ball 182, communication is terminated between the operational chamber 190 and relief chamber 202 and with further movement of plunger 188 by the second piston 200, ball 182 is now moved off seat 173 to allow regulated pressurized supply fluid to flow from supply chamber 174 into the operational chamber 190 in a manner as shown in FIG. 6. The regulated pressurized supply fluid presented to operational chamber 190 is immediately communicated to the second set of wheel brakes 18,18' to effect a brake application.

The regulated pressurized supply fluid communicated to the operational chamber 190 by the operation of plunger 188 by the secondary actuation piston 208 is also supplied to actuation chamber 125 and moves the power piston 118 in bore 102 such that seal 119 carried by projection 117' moves past compensation port 106 to pressurize fluid in bore 112.

When the situation desired to be corrected is either an anti-skid control or dynamic control, the pressurized supply fluid continues to act on the power piston 118 and move the projection 117' in bore 112 to pressurize operational fluid which is supplied to the first set of wheel brakes 14,14' to effect a corresponding brake application of a wheel brake by the selective actuation of the build solenoid valve 15 or the hold solenoid valve 15' to correct the situation.

When the situation desired to be corrected is traction control, once the seal 119 has passed compensation port 106, a hydraulic lock is created in bore 112 by closing the build solenoid valves 15 for each of the first set of wheel brakes 14,14' such that power piston 118 remains in a stationary position within bore 102 and braking is limited to the wheel brakes in the second set of wheel brakes 18,18' which are supplied pressurized supply fluid by conduit 20 connected to passage 130. The ECU 40 will selectively activate an individual build solenoid valve 15 or hold solenoid valve 15' associated with each the wheel brakes 18,18' to correct the situation.

When the ECU 40 determines the undesirable condition is over or has been reduced to a safe operation situation, the operating signal for solenoid 34 is terminated and a relief solenoid 34' opens to allow the pressurized supply fluid in chamber 212 to flow to reservoir 108' for the motor pump 24. As the pressurized supply fluid flows from chamber 212, return spring 184 moves ball 182 into engagement with seat 173 to seal the supply chamber 174 and return spring 185 returns plunger 188 and the second piston 200 to a rest position, as best shown in FIG. 2, such that bore 112' and the operational chamber 190 in the first housing 100 are connected to cavity 202 for replenishing any fluid need to maintain the system.

We claim:

1. A hydraulic brake booster for use in a brake system having a housing with a first bore separated from a second bore, said first bore retaining a first piston and said second bore retaining a control valve, an input member connected to said first piston and linked to said control valve by a lever arrangement, said second bore being connected to a source of pressurized supply fluid and said first bore being connected to wheel brakes of a vehicle, said control valve being responsive to a braking force applied by said input member for communicating regulated pressurized supply fluid that acts on and moves said first piston in said first bore to pressurize operational fluid that is supplied to said wheel brakes and effect a brake application, said hydraulic brake booster being characterized by a first passage that connects said second bore to said first bore for communicating said regulated pressurized supply fluid to said first bore, said first piston cooperating with said housing to define an actuation chamber within said first bore for receiving said regulated pressurized supply fluid, said regulated pressurized supply fluid in said actuation chamber acting on and moving said first piston to develop said operational fluid that is communicated to a first set of wheel brakes to effect a brake application and said regulated pressurized supply fluid being communicated from said second bore to a second set of wheel brakes to effect a brake application therein, said first piston having an annular projection that extends through an opening in said housing with a third bore therein, a reaction piston connected to said input member and located in said third bore to define a reaction chamber, said actuation chamber being connected to said reaction chamber such that said regulated pressurized supply fluid acts on said reaction piston to provide an operator with an indication of the development of said operational fluid in said first bore, and wherein said control valve includes a cylindrical member located in said second bore to define a supply chamber within said second bore that is connected to said pressurized supply fluid, said cylindrical member having an axial seat thereon and a first stem member that is located in said supply chamber has a face thereon that is urged toward said axial seat by a first spring to close said supply chamber and retain said pressurized supply fluid within said supply chamber.

2. The hydraulic brake booster as recited in claim 1 wherein said cylindrical member of said control valve is further characterized by a central bore that is connected to said first bore by way of a cross-bore and said first passage and to said second set of wheel brakes by a second passage, and a plunger that engages said cylindrical member, said plunger being located in said central bore to define an operational chamber, said plunger having a second stem member that extends into said operational chamber, said plunger being connected to said lever arrangement and reacting to an input force from said lever arrangement by sequentially moving said second stem member into engagement with said face on said first stem member to interrupt communication between said operational chamber and said relief chamber and thereafter moving said face away from said seat to allow pressurized supply fluid to flow from said supply chamber and be communication through said first passage to said first bore and through said second passage to said second set of wheel brakes as said regulated pressurized supply fluid.

3. The hydraulic brake booster as recited in claim 2 further characterized by a second housing that is connected to said first housing and encloses said plunger, said lever arrangement and said input member from the surrounding environment to define said relief chamber.

4. The hydraulic brake booster as recited in claim 3 wherein said second housing holds said cylindrical member of said control valve in said second bore, said second housing having an annular indentation that is in substantially axial alignment with said second bore, said annular indentation retaining a second piston to define a secondary actuation chamber, said second piston being connected to said plunger while said secondary actuation chamber is selectively connected to receive pressurized supply fluid as a function of an electronic control unit, said pressurized supply fluid acting on said second piston to sequentially move said second stem member carried on said plunger into engagement with said face on said first stem member and thereafter move said face away from said seat to allow said regulated pressurized supply fluid to be directly supplied through said second passage to said second set of wheel brakes for effecting a brake application.

5. The hydraulic brake booster as recited in claim 4 wherein said plunger is further characterized by a third passage that connects said operational chamber to said relief chamber through said second stem member when said face on said first stem member engages said seat on said cylindrical member.

6. The hydraulic brake booster as recited in claim 4 further characterized by means to inhibit movement of said first piston when pressurized supply fluid is supplied to said secondary actuation chamber.

7. The hydraulic brake booster as recited in claim 6 wherein said means to inhibit movement of said first piston is characterized by a valve that receives an operational signal from said electronic control unit after pressurized supply fluid is supplied to said secondary actuation chamber to allow said first piston to initially move and termination communication between said first bore and said relief chamber, said valve being responsive to said operational signal to close communication between said first bore and said first set of wheel brakes to create a hydraulic lock in said first bore that holds said first piston in a stationary position.

8. The hydraulic brake booster as recited in claim 7 wherein said lever arrangement is characterized by first and second arm each having a first end which is fixed on a pin carried by said first piston, a first nib that extends from a second end and is located in a groove in a sleeve carried by said plunger and a second nib located in a slot of a bracket carried by the input member, said sleeve allowing said plunger to independently move without an interference from said lever arrangement when said first piston is held in a stationary position by said hydraulic lock.

9. A hydraulic brake booster for use in a brake system having a housing with a,first bore separated from a second bore, said first bore retaining a power piston and said second bore retaining a control valve, an input member connected to said power piston and linked to said control valve by a lever arrangement, said second bore being connected to a source of pressurized supply fluid, said first bore being connected to wheel brakes of a vehicle, said lever arrangement supplying said control valve with an input force in responsive to a braking force applied to said input member to meter pressurized supply fluid and create regulated pressurized supply fluid that acts on and moves said power piston in said first bore to pressurize operational fluid in said first bore, said operational fluid being supplied to said wheel brakes to effect a brake application, said hydraulic brake booster being characterized by a first passage that connects said second bore to said first bore and a second passage, said regulated pressurized supply fluid being communicated through said first passage to act on said power piston and develop said operational fluid in said first bore that is communicated to a first set of wheel brakes during a brake application and directly through said second passage to a second set of wheel brakes during the brake application; and a second housing that encloses said control valve, lever arrangement and a projection that extends from said power piston to define a relief chamber having a permanent low fluid pressure, said first bore and second bore being connected to said relief chamber in absence of an input force being applied to said control valve.

10. The hydraulic brake booster as recited in claim 9 wherein said control valve is characterized by a cylindrical member fixed in said second bore by said second housing to define a supply chamber within said second bore, a first stem member located in said second bore and urged into engagement with a seat on said cylindrical member to close said supply chamber, a plunger carried in a central bore within said cylindrical member to define an operational chamber within said second bore and having a second stem thereon that extends into said operational chamber, said operational chamber being connected to said relief chamber by way of said second stem and to said first passage, said plunger responding to an input force from said lever arrangement by initially moving within said operational chamber to bring said second stem into engagement with said first stem to interrupt communication between said operational chamber and said relief chamber and thereafter moving said first stem away from said seat to meter supply fluid from said supply chamber into said operational chamber as said regulated pressurized supply fluid.

11. The hydraulic brake booster as recited in claim 10 wherein said second housing is further characterized by a third bore which receives a second piston to define a secondary actuation chamber, said second piston being connected to said plunger and responding to secondary pressurized fluid supplied to said secondary actuation chamber by initially moving said plunger in said operational chamber to bring said second stem into engagement with said first stem to interrupt communication between said operational chamber and said relief chamber and thereafter moving said first stem away from said seat and meter supply fluid from said supply chamber into said operational chamber and supply said second set of wheel brakes with said regulated pressurized supply to effect a brake application.

12. The hydraulic brake booster as recited in claim 11 as further characterized by said regulated pressurized supply moving said power piston to close communication between said first bore and said relief chamber when said secondary pressurized fluid is supplied to said secondary actuation chamber and means to inhibit movement of said power piston after closure of said communication to said relief chamber to maintain said input member in a stationary position.

13. The hydraulic brake booster as defined in claim 12 wherein said means to inhibit movement of said first piston is characterized by a solenoid valve that closes communication to said first set of wheel brakes to create a hydraulic lock in said first bore.

14. The hydraulic brake booster as recited in claim 13 wherein said operational chamber and a reaction chamber are characterized by being formed between said plunger and said second piston to balance forces across said plunger when an input force is received from said lever arrangement.

15. The hydraulic brake booster as recited in claim 14 wherein said control valve is further characterized by a first spring located in said operational chamber that assists in moving said plunger toward a rest where communication is established between said second passage and said relief chamber and a second spring located between a sleeve and said second piston that urges said second piston toward said second actuation chamber to define a rest position for said second piston.

16. The hydraulic brake booster as recited in claim 11 as further characterized by said regulated pressurized supply moving said power piston to close communication between said first bore and said relief chamber when said secondary pressurized fluid is supplied to said secondary actuation chamber to develop said operational fluid that is communicated to said first set of wheel brakes during a secondary brake application.

* * * * *